(12) United States Patent
Rho

(10) Patent No.: US 7,710,520 B2
(45) Date of Patent: May 4, 2010

(54) LIQUID CRYSTAL DISPLAY DEVICE WITH REDUCED DEFECT RATE AND IMPROVED COLOR REPRODUCTIVITY

(75) Inventor: Soo-guy Rho, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 129 days.

(21) Appl. No.: 11/486,499

(22) Filed: Jul. 14, 2006

(65) Prior Publication Data

US 2007/0013839 A1      Jan. 18, 2007

(30) Foreign Application Priority Data

Jul. 14, 2005    (KR) .................... 10-2005-0063618

(51) Int. Cl.
*G02F 1/1335* (2006.01)

(52) U.S. Cl. ...................... 349/113; 349/108

(58) Field of Classification Search .............. 349/113, 349/108
See application file for complete search history.

(56) References Cited

U.S. PATENT DOCUMENTS

| | | | | |
|---|---|---|---|---|
| 5,404,005 | A * | 4/1995 | Shimomura et al. ....... | 250/208.1 |
| 5,661,371 | A * | 8/1997 | Salerno et al. ............ | 315/169.3 |
| 5,846,677 | A * | 12/1998 | Nomura et al. ................ | 430/7 |
| 7,277,142 | B2 * | 10/2007 | Lee et al. .................... | 349/106 |
| 7,330,231 | B2 * | 2/2008 | Kim et al. ................... | 349/114 |
| 2002/0113927 | A1 * | 8/2002 | Ha et al. ...................... | 349/113 |
| 2004/0126706 | A1 * | 7/2004 | Fujibayashi et al. ......... | 430/315 |
| 2005/0174517 | A1 * | 8/2005 | Kim et al. .................... | 349/114 |
| 2006/0215087 | A1 * | 9/2006 | Matsushima et al. ........ | 349/114 |
| 2008/0106663 | A1 * | 5/2008 | Kim et al. ..................... | 349/43 |

FOREIGN PATENT DOCUMENTS

| | | |
|---|---|---|
| CN | 1525224 | 9/2004 |
| CN | 1619402 A | 5/2005 |
| JP | 11-052415 | 5/2002 |
| JP | 2002-214425 | 7/2002 |
| JP | 2004-199034 | 7/2004 |
| JP | 2005-055825 A | 3/2005 |
| JP | 2005-099710 A | 4/2005 |
| JP | 2005-173037 A | 6/2005 |
| KR | 1020000052103 | 8/2000 |

* cited by examiner

*Primary Examiner*—K. Cyrus Kianni
(74) *Attorney, Agent, or Firm*—Innovation Counsel LLP (57) ABSTRACT

A liquid crystal display device that reduces the likelihood of liquid crystal misalignment and driving errors is presented. The liquid crystal display device also improves color reproductively. The device includes a first substrate, and second substrate, and a liquid crystal layer placed between the first substrate and the second substrate. The first substrate includes a gate line and a data line that define a pixel region, a thin film transistor provided at an intersection area of the gate line and the data line, an organic film formed on the thin film transistor and having a depressed portion, a reflective film formed on the organic film, a black matrix, a color filter layer formed in the pixel region, and a pixel electrode formed on the color filter layer. The color filter layer has a different thickness in the depressed portion than in the rest of the pixel region.

19 Claims, 8 Drawing Sheets

LIQUID CRYSTAL DISPLAY DEVICE WITH REDUCED DEFECT RATE AND IMPROVED COLOR REPRODUCTIVITY

This application claims priority to Korean Patent Application No. 2005-0063618 filed on Jul. 14, 2005 and all the benefits accruing therefrom under 35 U.S.C. §119, and the contents of the application in its entirety are herein incorporated by reference.

BACKGROUND OF THE INVENTION

1. Field of the Invention

The present invention relates generally to a liquid crystal display device and more particularly to a liquid crystal display device having a transflective color filter on an array (COA) structure.

2. Description of the Related Art

In general, a liquid crystal display (LCD) device includes a liquid crystal display panel, a backlight unit, a driving unit, a chassis and the like. The LCD panel is composed of a thin film transistor (TFT) substrate having a TFT formed thereon, a color filter substrate bonded to the TFT substrate and having a color filter layer formed thereon, and a liquid crystal layer disposed between the two substrates.

During the manufacturing of a LCD panel, the TFT substrate and the color filter substrate are bonded to each other. During this bonding process, a precise alignment of the two substrates is required. Problematically, even a minute mis-alignment of the substrates produces a defect in the LCD panel and specifically, in a reduction in the LCD panel's opening rate. In order to solve these problems, a color filter on array (COA) structure has been developed wherein both the TFT and the color filter are formed on the same substrate. More specifically, a TFT is formed on a TFT insulating substrate and a color filter layer is formed on the TFT to prepare a first substrate, and an opposing second substrate is prepared by forming only a common electrode on a second insulating substrate. The COA structure eliminates the need for precise alignment between the TFTs and the color filters upon bonding, thus advantageously reducing alignment errors upon bonding the substrates.

An LCD panel is a non-light emitting element and thus a backlight unit for supplying light is disposed on the rear side of the TFT substrate. The light radiated from the backlight unit changes its light transmissivity with arrangement of the liquid crystal layer.

An LCD device is categorized into a transmissive LCD device that uses only the light supplied from a backlight unit and a transflective LCD device that uses external light in addition to light from a backlight unit.

The transflective LCD device simultaneously uses light from a backlight unit that is transmitted through a transmissive area and external light from a source outside the device itself (such as the sunlight or ambient light). Thus, in outdoor or daytime environment where there is an abundance of ambient light, light incident on the LCD panel can be used by being reflected off a reflective film in a reflective area of the display that is formed on a TFT substrate. This ability to take advantage of ambient light reduces power consumption to one third of that used by a comparable transmissive LCD device. Thus, the service life of the light source and the battery can be extended by operating an LCD device in a transflective mode. A longer battery life improves the general performance of portable communication devices that incorporate the LCD.

For these reasons, LCD devices having a transflective COA structure have become increasingly popular. A transflective COA structure combines the low power consumption advantage of a transflective LCD panel and the low defect rate of the COA structure. However, in the current transflective COA structure, a difference in the light path through the color filter layer occurs between the transmissive area and the reflective area, thus causing a difference in the lengths of light paths between the transmissive and reflective areas. This difference in the light path lengths create inconsistencies in the reproduced colors, thereby decreasing color reproductivity. In order to achieve consistency in color and enhance color reproductivity, a light hole is formed on the color filter layer in the reflective area. Lights passing through the color filter layer and the light hole of the reflective area are mixed to match the color produced in the transmissive area, enhancing color reproductivity.

However, when forming the light hole, a stepped portion forms in the hole area during patterning. The presence of the stepped portion causes unintended orientations of the liquid crystal in the reflective area and defective driving of the liquid crystal by creating a difference in the cell gap among the hole area, the reflective area and the transmissive area.

BRIEF SUMMARY OF THE INVENTION

The invention provides a liquid crystal display device in which liquid crystal mis-alignment and driving error are reduced while color reproductivity is improved. The invention also provides a method of fabricating such a liquid crystal display device.

In one aspect, the invention is a liquid crystal display device comprising a first substrate, a second substrate substantially parallel to the first substrate, and a liquid crystal layer placed between the first substrate and the second substrate. The first substrate includes a first insulating substrate, a gate line and a data line extending in substantially perpendicular directions on the first insulating substrate to define a pixel region, a thin film transistor provided at an intersection area of the gate line and the data line and having a drain electrode, an organic film formed on the thin film transistor and having a depressed portion, a reflective film formed on the organic film, a black matrix surrounding the pixel region, a color filter layer formed in the pixel region and having a different thickness in the depressed portion than in the rest of the pixel region, and a pixel electrode formed on the color filter layer.

In another aspect, the invention is a method of fabricating a liquid crystal display device. The method entails forming a gate line, a data line and a thin film transistor on an insulating substrate, wherein the thin film transistor includes a drain electrode and the gate line and the data line define a pixel region; forming an organic film on the thin film transistor, the organic film including a depressed portion; forming a reflective film on the organic film; forming a black matrix along the periphery of the pixel region; forming a color filter layer within the pixel region, the color filter layer being thicker in the depressed portion than in the rest of the pixel region; and forming a pixel electrode on the color filter layer.

In yet another aspect, the invention is a substrate for a liquid crystal display device. The substrate includes: a first insulating substrate, a gate line and a data line extending in substantially perpendicular directions on the first insulating substrate to define a pixel region, a thin film transistor provided at an intersection area of the gate line and the data line and having a drain electrode, an organic film formed on the thin film transistor and having a depressed portion, a reflective film formed on the organic film, a black matrix surrounding the pixel region, a color filter layer formed in the pixel region and having a different thickness in the depressed portion than in the rest of the pixel region, and a pixel electrode formed on the color filter layer.

BRIEF DESCRIPTION OF THE DRAWINGS

FIGS. 3a to 3e are sectional views explaining a method of fabricating the first substrate of the liquid crystal display device according to the first embodiment of the present invention.

DETAILED DESCRIPTION OF THE EMBODIMENTS

Hereinafter, one or more embodiments will be described in detail with reference to the accompanying drawings. In the embodiments, like elements are denoted by like reference numerals. Recurring elements will be explained in the first embodiment but their description may not be explained in the other embodiments to avoid redundancy. In the drawings, the thickness of layers, films, and regions are exaggerated for clarity. It should be noted that, when an element such as a layer, film, region, or substrate is referred to as being "on" another element, it can be directly on the other element or intervening elements may also be present.

Figure 1:
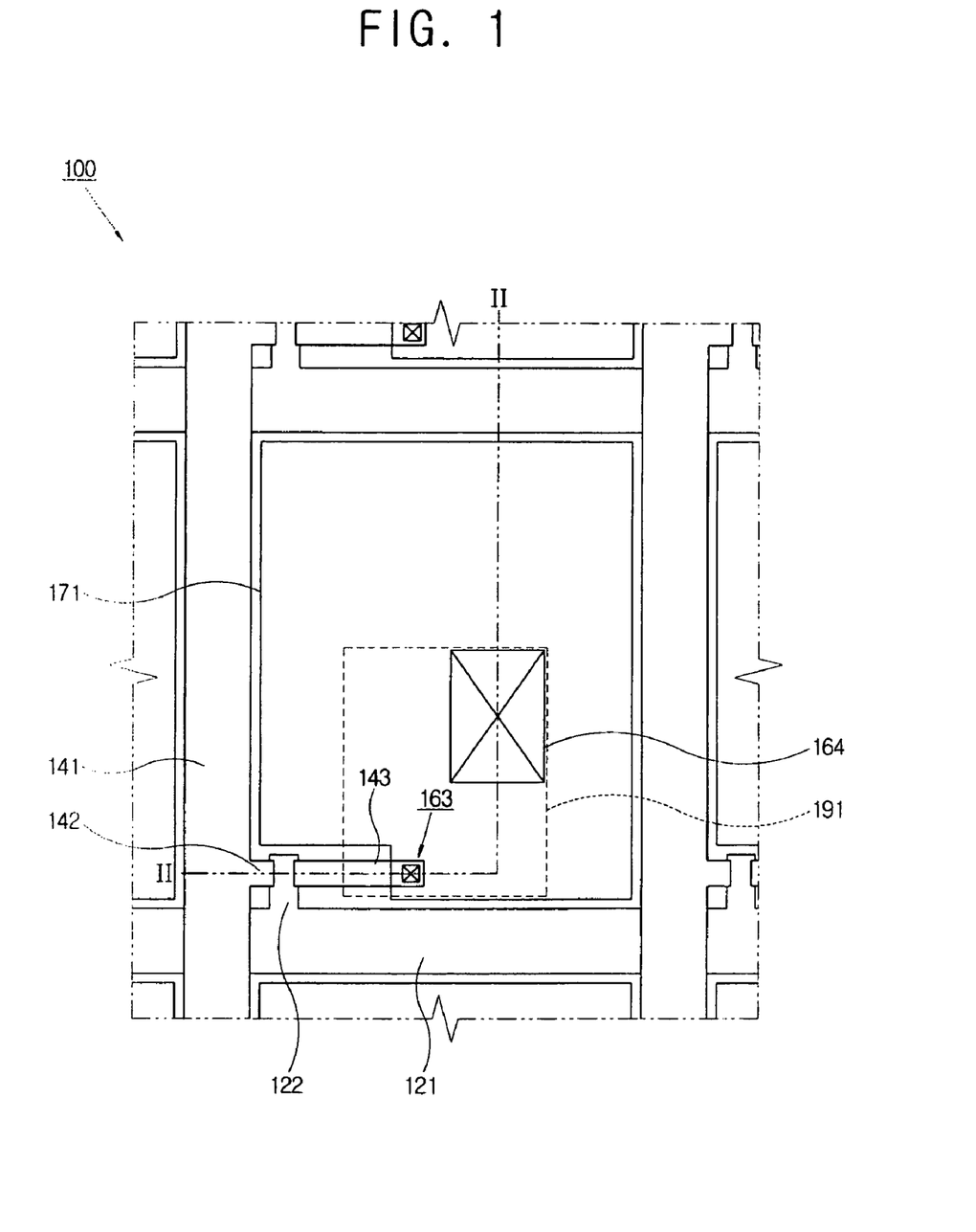
FIG. 1 is a configuration of a first substrate in a liquid crystal display device according to a first embodiment of the present invention.
Figure 2:
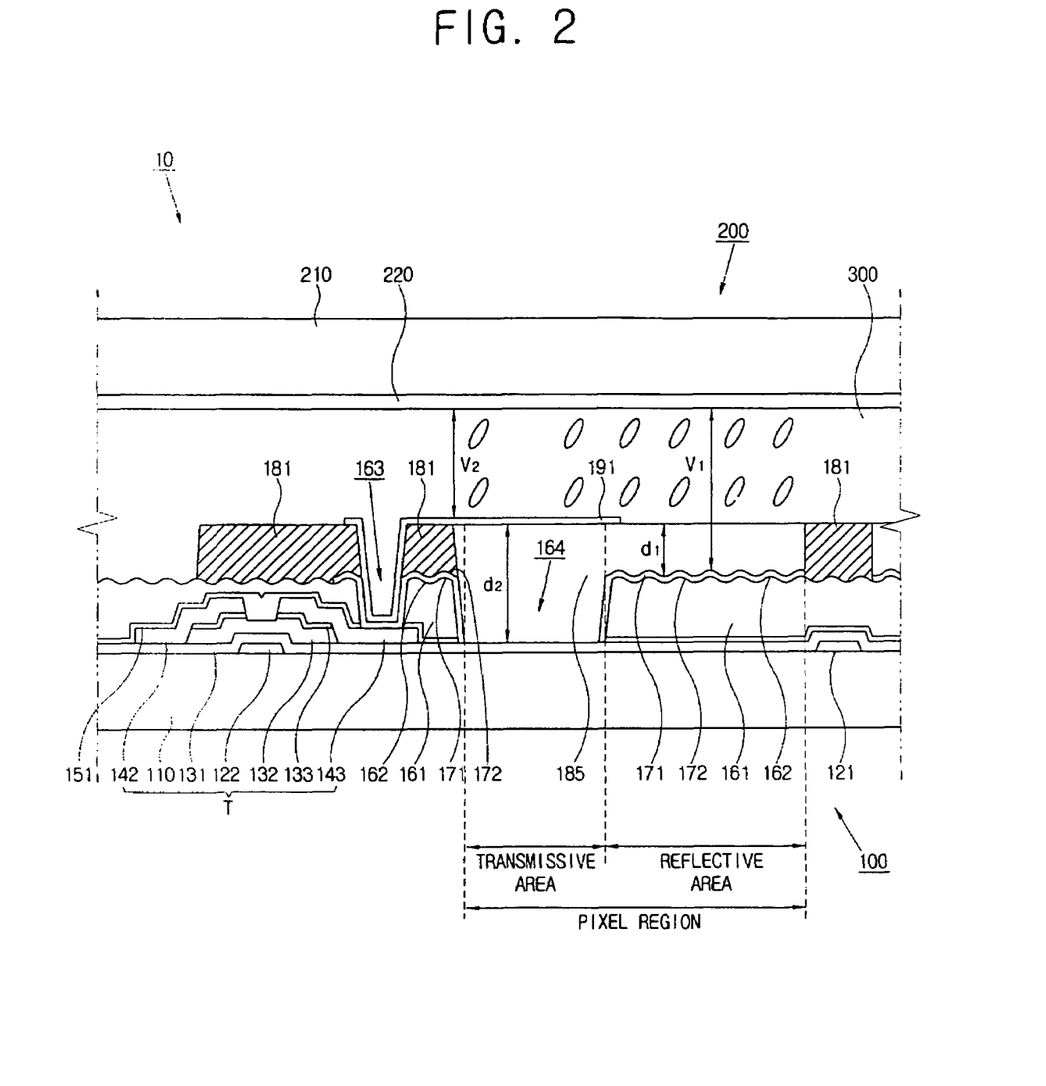
FIG. 2 is a sectional view of a liquid crystal display panel taken along the line II-II in FIG. 1.

Referring to FIGS. 1 and 2, a liquid crystal display (LCD) device according to a first embodiment of the present invention will be explained. In this embodiment, the liquid crystal display panel in the LCD device has a transflective COA structure. FIG. 1 is a configuration of a first substrate in the liquid crystal display device according to the first embodiment of the invention. FIG. 2 is a sectional view of a liquid crystal display panel taken along the line II-II in FIG. 1.

The LCD device according to the first embodiment of the present invention includes a liquid crystal display (LCD) panel 10 and a backlight unit (not shown) placed on the rear side of the LCD panel. The backlight unit (not shown) is well-known and details about it will not be described here. The present invention will be explained in the context of LCD panel 10.

The LDC panel 10 includes a first substrate 100, a second substrate 200 positioned substantially parallel to the first substrate 100, and a liquid crystal layer 300 disposed between the first substrate 100 and the second substrate 200.

The first substrate 100 will now be explained. A gate wiring, which includes a gate line 121 and a gate electrode 122, is formed on a first insulating substrate 110 from a single layer. The first insulating substrate 110 is typically formed of glass materials but may also be formed of plastic materials to produce a device that is thin and flexible. Examples of suitable plastic materials include polycarbon, polyimide, polyethersulfone (PES), polyarylate (PAR), polyethylene naphthalate (PEN), or polyethylene terephthalate (PET), among others.

The gate line 121 extends in a first direction and the gate electrode 122 is connected to the gate line 121. The gate wiring (121 and 122) may be formed of a single metallic layer or multiple metallic layers. The gate line 121 crosses a data line 141 (while maintaining electrical separation from each other) to define a pixel region. The pixel region includes a transmissive area that transmits light from the backlight unit (not shown) and a reflective area surrounding the transmissive area and having a reflective film 171 formed in it to reflect light from outside of a second insulating substrate 210.

On the first insulating substrate 110 and the gate wiring (121, 122) is formed a gate insulation film 131 that contains silicon nitride (SiNx) or the like.

On the gate insulation film 131 of the gate electrode 122 is formed a semiconductor layer 132 composed of a semiconductor such as amorphous silicon. On the semiconductor layer 132 is formed an ohmic contact layer 133 formed of n+ hydrogen amorphous silicon or the like, which is doped with silicide or n-type impurity in high concentration. The semiconductor layer 132 is formed as an island on top of the gate electrode 122, and the ohmic contact layer 133 is divided into two parts, one on either side of the gate electrode 122.

Data wiring is formed from a single layer deposited on the ohmic contact layer 133 and the gate insulation layer 131. The data wiring includes a data line 141, a source electrode 142, and a drain electrode 143. The data line 141 extends in a second direction that is perpendicular to the first direction at regular intervals and define the pixel region with the gate lines 121, as described above. The source electrode 142 branches from the data line 141 and extends to cover the ohmic contact layer 133. The drain electrode 143 is formed across the gate electrode 122 from the source electrode 142 with the gate electrode 122. Similar to the gate wiring (121 and 122), the data wiring (141, 142 and 143) may be formed of a single metallic layer or multiple metallic layers.

A protective inorganic film 151 is formed on the data wiring (141, 142, and 143) and on that portion in the semiconductor layer 132 that is not covered by the data wiring. The inorganic film 151 is formed typically of silicon nitride. A portion of the drain electrode 143 is not covered by the inorganic film 151 because of a drain contact hole 163 exposing the drain electrode 143. The inorganic film 151 is also not formed on a depressed portion 164.

An organic film 161 is formed on the inorganic film 151. Where signal lines (i.e., the gate line 121 and the data line 142) are close to the reflective film 171 serving as an electrode and the pixel electrode 191, the inorganic film 151 or the like placed between the signal lines 121 and 141 and the reflective film 171, or between the signal lines 121 and 141 and the pixel electrode 191 acts as a dielectric substance and has a capacitance. Thus, a cross-talk may occur. Therefore, the reflective film 171 and the pixel electrode 191 are spaced apart from the signal lines 121 and 141 by a certain distance in order to reduce the cross-talk, so that the opening rate is lowered. The organic film 161 functions to increase the distance between the signal lines 121 and 141 and the reflective film 171, or between the signal lines 121 and 141 and the pixel electrode 191 to thereby decrease the capacitance, thus further reducing the possibility for a cross-talk. The organic film 161 allows the reflective film 171 and the pixel electrode 191 to extend close to the area right above the signal lines 121 and 141, thereby improving the aperture rate. The organic film 161 is formed typically of any one of benzocyclobutene and acrylic resin, which are photosensitive materials. A corrugated lens 162 is formed on a surface of the organic film 161. Similarly to the inorganic film 151, there is no organic film 161 in the drain contact hole 163. Also, the organic film 161 is not formed in the depressed portion 164, which is a transmission window of the transmissive area through which the light from the backlight unit (not shown) is transmitted.

The reflective film 171 is formed on the lens 162. The reflective film 171 is formed typically of aluminum or silver but, in certain cases, may be formed of a two layers: an aluminum layer and a molybdenum layer. The reflective film 171 directly contacts the drain electrode 143 through the drain contact hole 163. The reflective film 171 is not formed on the depressed portion 164, on the organic film 161 placed above the thin film transistor T, on the gate line 121, and on the non-display area. A corrugated lens 172 is formed on the reflective film 171 to thereby improve the reflectivity of the light incident from the outside of the second insulating substrate 210.

A black matrix 181 is formed on the organic film 161 and the reflective film 171 in such a way as to form a border around the pixel region. The black matrix 181 is formed of a photosensitive organic material containing a blackish colorant. Since the black matrix 181 outlines the pixel regions, it forms a lattice in plan view and is formed along the gate line 121 and the data line 141 of the first substrate 100. In addition, the black matrix 181 is formed on the semiconductor layer 132 to prevent light from reaching the semiconductor layer 132.

A color filter layer 185 is placed within the pixel region defined by the black matrix 181 and is thicker in the depressed portion 164 than in the rest of the pixel region. The color filter layer 185 is formed of any one of photosensitive coloring organic compositions and is red, green blue, cyan, magenta, or yellow. Multiple color filter layers 185, each having one of the above colors, is alternately formed in each pixel region of the first substrate 100. Red, green, and blue color filter layers 185 may be grouped together, and cyan, magenta, and yellow color filter layers 185 may be grouped together. The color filter layer 185 colors the light that passes through the transmissive area and the light that reflects off the reflective area. The color filter layer 185 is formed by coating a liquid through an inkjet method, such that the surface that is farthest away from the first insulating substrate 110 is substantially flat across the transmissive area and the reflective area. Therefore, the thickness d2 of the color filter layer 185 formed in the depressed portion 164 is greater than the thickness d1 of the color filter layer 185 formed in the reflective area. The thickness d2 of the color filter layer 185 formed in the depressed portion 164 must be about 1.5 to 2.5 times, and preferably about two times, the thickness d1 of the color filter layer 185 formed in the reflective area.

In the transflective LCD device, the transmissive area and the reflective area in the pixel region must have the same high color reproductivity to prevent differences between colors in the respective region. "Color reproductivity" refers to an index representing the performance of reproducing the real color of an object. The color reproductivity is determined by the thickness of the color filter layer 185 through which light passes. The light traveling through the color filter layer 185 in the reflective area reaches the color filter layer 185 from the external surface of the second substrate 200 (the top surface of the second substrate 200 in FIG. 2) and is reflected on the reflective film 171 to propagate back toward the second substrate 200. Accordingly, in this case, the light travels twice through the thickness d1 of the color filter layer 185. Therefore, the thickness d2 of the color filter layer 185 in the transmissive area being approximately twice of the thickness d1 in the reflective area equalizes the travel distance for light in the two areas. The light that passes through the transmissive area from the backlight unit (not shown) from the side of the first substrate 100 travels through the color filter layer 185 that is twice as thick as the thickness d1 of the color filter layer 185 in the reflective area. The thickness of the color filter layer 185 placed in the reflective and transmissive areas can be made different from each other with the inkjet method, thus improving the overall color reproductivity. In addition, by employing the inkjet method, the surface of the color filter layer 185 that is on the other side of the corrugated lens 172 can be made flat, so that the liquid crystal molecules retained in the liquid crystal layer 300 can have uniform orientations. This way, the likelihood of liquid crystal molecules being mis-oriented is reduced.

The pixel electrode 191 is formed on the black matrix 181 and the color filter layer 185. The pixel electrode 191 is formed of a transparent conductive material such as ITO (indium tin oxide) and IZO (indium zinc oxide). The pixel electrode 191 overlaps the reflective film 171, which is formed in the drain contact hole 163 and electrically connected with the drain electrode 143 through the reflective film 171. The pixel electrode 191 is locally formed on the color filter layer 185 of the depressed portion 164. The pixel electrode 191 also is formed on the color filter layer 185 and has a flat surface, thus reducing the likelihood of liquid crystal molecules being mis-oriented.

The second substrate 200 includes a second insulating substrate 210. The second substrate 200 is combined with the first substrate 100 such that the first and second insulating substrates 110, 210 form outside surfaces. A common electrode 220 is formed on the second insulating substrate 210.

The second insulating substrate 210 may be formed of glass or plastic materials, similarly to the first insulating substrate 110.

The common electrode 220 is formed over the entire surface of the second insulating substrate 210. The common electrode 220 may be formed by vapor deposition through a sputtering process using a transparent conductive material such as ITO (indium tin oxide) or IZO (indium zinc oxide). The common electrode 220 applies a signal voltage directly to the liquid crystal molecules of the liquid crystal layer 300, along with the reflective film 171 and the pixel electrode 191 of the first substrate 100.

In the LCD device according to the first embodiment of the present invention, the pixel electrode 191 and the reflective film 171 receiving the signal voltage of the drain electrode 143 are separately formed in the transmissive area and the reflective area, respectively. Thus, the electric field V1 between the common electrode 220 and the reflective film 171 can be made to be different from the electric field V2 between the common electrode 220 and the pixel electrode 191. The dual driving method compensates for the difference between the transmissive area and the reflective area. Therefore, in spite of the dissimilar structures of the transmissive and reflective areas in the first substrate 100, defective operation is prevented which could be caused by a mismatch in driving the liquid crystal molecules of the two areas. Thus, the optical characteristics of liquid crystal molecules can be adequately utilized.

The substrates 100 and 200 are bonded to each other by means of a sealant (not shown) placed along the edge of the second substrate 200. The sealant (not shown) contains an ultraviolet-curing resin such as an acrylic resin. In addition, the sealant may further contain a thermosetting resin such as epoxy resin, an amine hardener, a filler such as aluminum powder, and a spacer. A screen mask method or a dispenser method may be used to position the sealant along a desired line. The sealant has an injection port (not shown) for injecting the liquid crystal molecules.

The liquid crystal layer 300 containing liquid crystal molecules is placed in the internal display area enclosed by the sealant (not shown). The liquid crystal layer 300 is placed inside a space formed by both substrates 100 and 200 and the sealant (not shown). The liquid crystal molecules of the liquid crystal layer 300 change their alignments according to an electric field between the reflective film 171 and the common electrode 220 and an electric field between the pixel electrode 191 and the common electrode 220. In the first embodiment of the invention, the liquid crystal layer 300 is in the vertically aligned (VA mode), which is well-known. However, this is not a limitation of the invention. For example, the liquid crystal layer 300 may take a TN (twisted nematic) mode. The liquid crystal layer 300 is formed in such a manner that both substrates 100 and 200 prepared above are bonded by means of the sealant (not shown) and then liquid crystal molecules are injected between the substrates 100 and 200 through the injection port (not shown). This method of injecting liquid crystal molecules is called a filling method. The injection of liquid crystal molecules is performed using vacuum and nitrogen pressure. The liquid crystal molecules may be injected using a dropping method, in which case the injection port (not shown) is not used.

The LCD device according to the first embodiment of the present invention can reduce mis-orientation of the liquid crystal and the resulting errors in operation. Further, the LCD device according to the first embodiment of the invention has a good color reproductivity.

Hereinafter, a method of fabricating the LDC device according to the first embodiment of the present invention will be explained in reference to FIGS. 3a to 3e. FIGS. 3a to 3e are sectional views explaining a method of fabricating the first substrate 100 of the liquid crystal display device according to the first embodiment of the present invention.

Figure 3A:
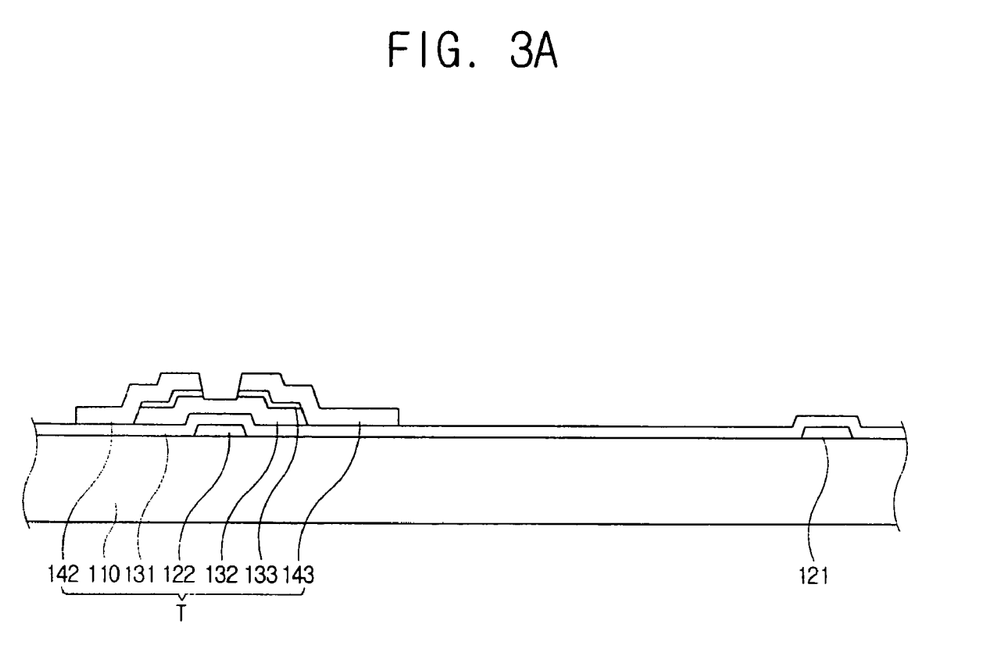

First, as shown in FIG. 3a, a thin film transistor T is formed on a first insulating substrate 110. To form the thin film transistor T, a gate metallic layer is vapor-deposited and patterned to form a gate line 121 and a gate electrode 122.

Then, a gate insulation film 131, a semiconductor layer 132 and an ohmic contact layer 133 are formed in sequence on the gate electrode 122. More specifically, the gate insulation film 131 formed of an inorganic material such as silicon nitride is vapor-deposited. After the deposition of the gate insulation film 131, the semiconductor layer 132 formed typically of amorphous silicon and the ohmic contact layer 133 formed typically of n+ silicon are vapor-deposited. That is, a three layers—the gate insulation film 131, the semiconductor layer 132 and the ohmic contact layer 133—are vapor-deposited. The semiconductor layer 132 and the ohmic contact layer 133 are patterned so that they remain only on and around the gate electrode 122. In some embodiments, however, the semiconductor layer 132 and the ohmic contact layer 133 may be formed even in the intersection area of the gate line 121 and the data line 141.

Then, a data metallic layer is vapor-deposited and patterned to form a data line 141, a source electrode 142, and a drain electrode 143, thus completing the thin film transistor T.

Figure 3B:
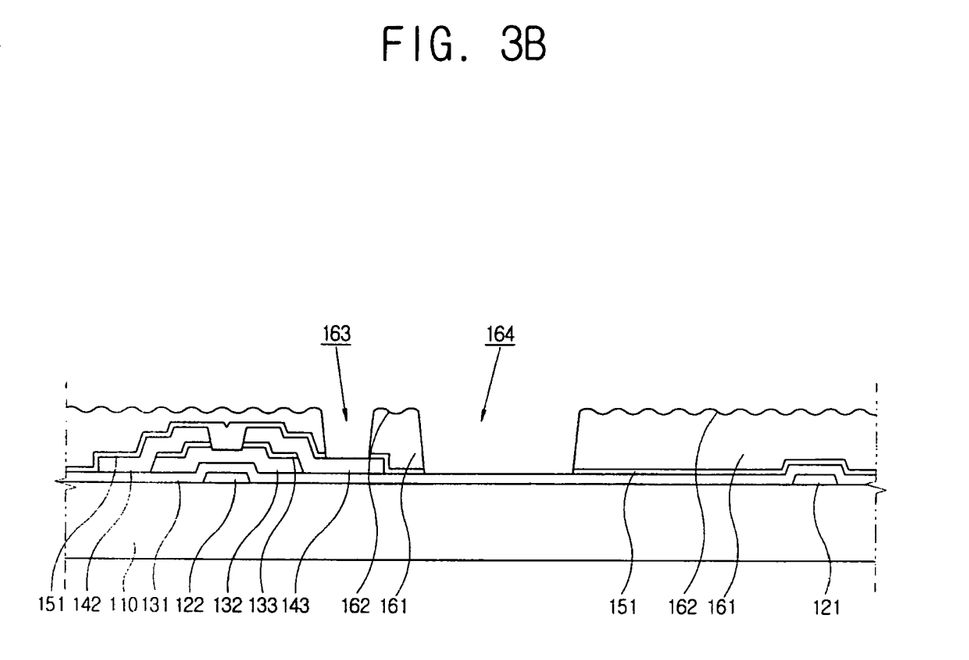

Next, as illustrated in FIG. 3b, the protective inorganic film 151 and the organic film 161 are formed on the thin film transistor T in sequence.

After the organic film 161 is deposited, a drain contact hole 163 exposing the drain electrode 143 and a depressed portion 164 (which is a transmissive window) are formed by removing portions of the organic film 161. The lenses 162 are formed on a surface of the organic film 161.

The organic film 161 is formed by vapor-depositing an organic material on the inorganic film 151 and then patterning the deposited organic material. The patterning operation includes exposing the organic film 161 to light with a mask covering the organic film. Slits are formed on the mask at different intervals to adjust the intensity of light-exposure. Accordingly, the intensity of light-exposure is high for the organic film 162 formed in the depressed portion 164, lower for the organic film 162 formed in the drain contact hole 163, and even lower for the organic film 161 formed in the lens 162. Then, after developing, the inorganic film 151 is etched and removed to form the drain contact hole 163 and the depressed portion 164. In the case of the depressed portion 164, only the organic film 161 may be removed, leaving the inorganic film 151. A surface of the organic film 161 has a corrugated pattern due to a lower intensity of light-exposure. When this surface is developed and heated to reflow, a corrugated lens 162 is formed.

The pattern of the lens 162 determines the pattern of the reflective film 171. The reflective film 171 allows light from the outside to be effectively reflected.

Figure 3C:
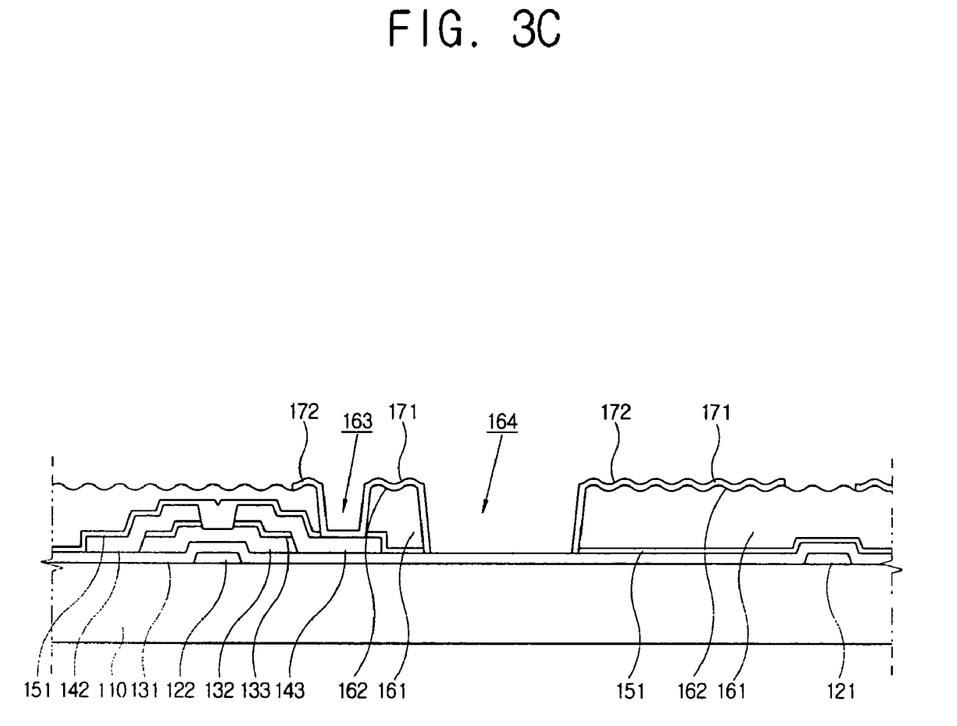

Thereafter, as illustrated in FIG. 3c, a reflective film 171 is formed on the organic film 161. The reflective film 171 is formed on substantially all of the organic film 161 except for the depressed portion 164, which is in the transmissive area. The reflective film 171 is formed on the lens 162 of the organic film 161, and thus has a similar corrugated pattern to improve reflectivity for the light from the outside. The reflective film 171 is electrically connected with the drain electrode 143 through the drain contact hole 163 and receives an electrical signal from the drain electrode 143. The reflective film 171 applies the signal to liquid crystal molecules placed on the reflective film 171.

Figure 3D:
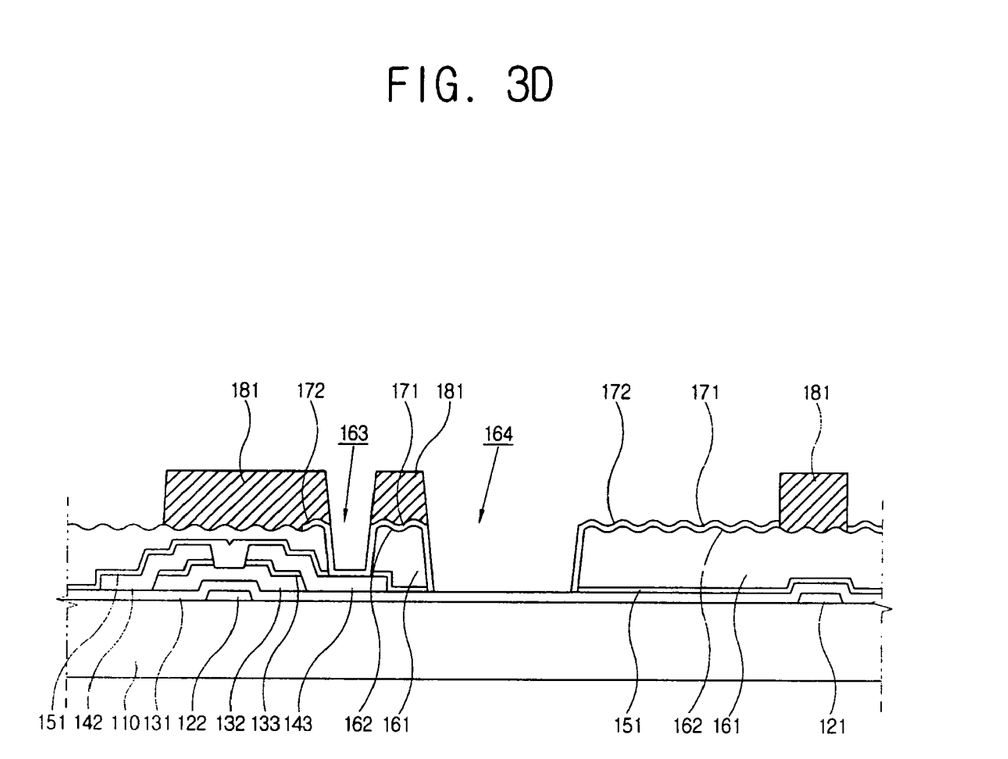

Next, as illustrated in FIG. 3d, a black matrix 181 is formed on the organic film 161 and the reflective film 171 along the periphery of the pixel region. More specifically, first, a blackish colorant is added to a photosensitive organic material to form a black matrix photosensitive liquid. Examples for the blackish colorant include black carbon or titanium oxide. The black matrix photosensitive liquid is coated on the organic film 161 and the reflective film 171, exposed to light, developed, and baked to form the black matrix 181 along the periphery of the pixel region.

Figure 3E:
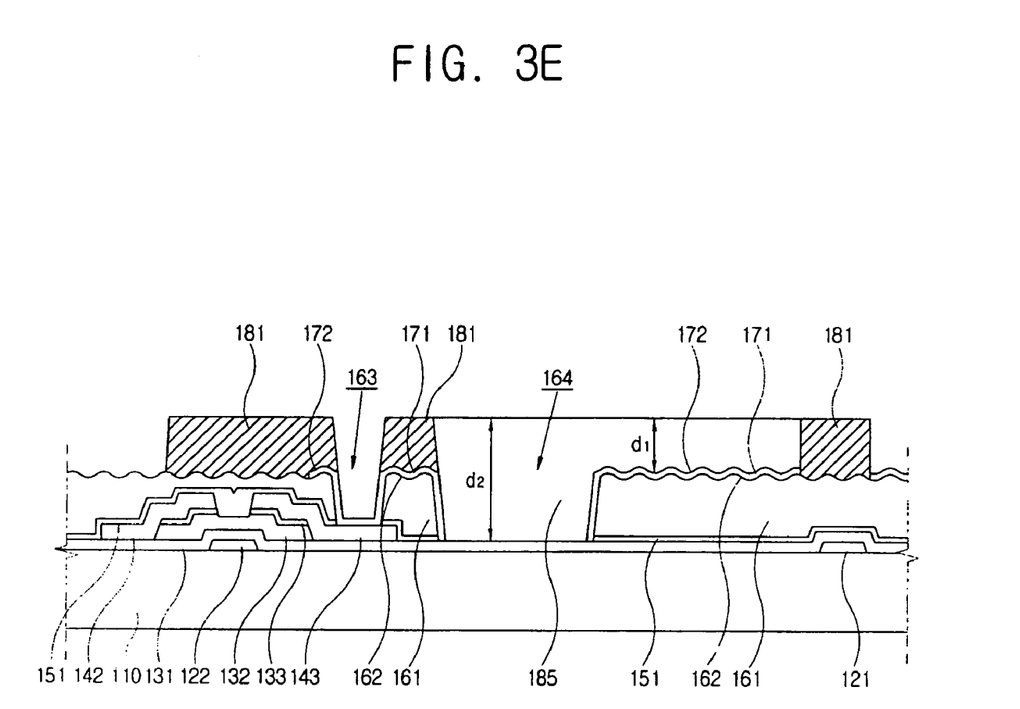

Then, as shown in FIG. 3e, a color filter layer 185 is formed within the pixel region delineated by the black matrix 181.

The color filter layer 185 is formed using a color filter liquid, which is made of a photosensitive coloring organic composition having three primary colors: either of red, green and blue, or of cyan, magenta, and yellow. That is, the color filter layer 185 is formed in such a way that the color filter liquid is coated on the depressed portion 164 and the reflective film 171 using an inkjet method, and baked. Thus, the color filter layer 185 can be formed such that it has a substantially surface. As explained above, the thickness d2 of the color filter layer 185 in the depressed portion 164 is greater than the thickness d1 of the color filter layer 185 in the reflective area so that the surface that is farthest from the first insulating layer 110 is substantially level. This way, color reproductivity is enhanced. To produce color images, the color filter layers 185 having the three colors mentioned above are arranged alternately in each pixel region.

Thereafter, a pixel electrode 191 is formed on the color filter layer 185 to form the first substrate 100. The pixel electrode 191 is formed by depositing a conductive layer on the color filter layer 185 and patterning. The pixel electrode extends into the drain contact hole 163 and over the depressed portion 164.

Next, a sealant (not shown) is formed along the periphery of the finished first substrate 100 to bond the first substrate 100 and the second substrate 200 to each other. Then, liquid crystal molecules are injected between the first and second substrates 100 and 200 to obtain the liquid crystal display panel of FIG. 2. Alternatively, the sealant (not shown) may be formed along the periphery of the second substrate 200 to bond the first substrate 100 to the second substrate 200.

A backlight unit (not shown) is attached to the rear surface of the liquid crystal display panel 10 to make the LCD device according to the first embodiment of the invention.

Figure 4:
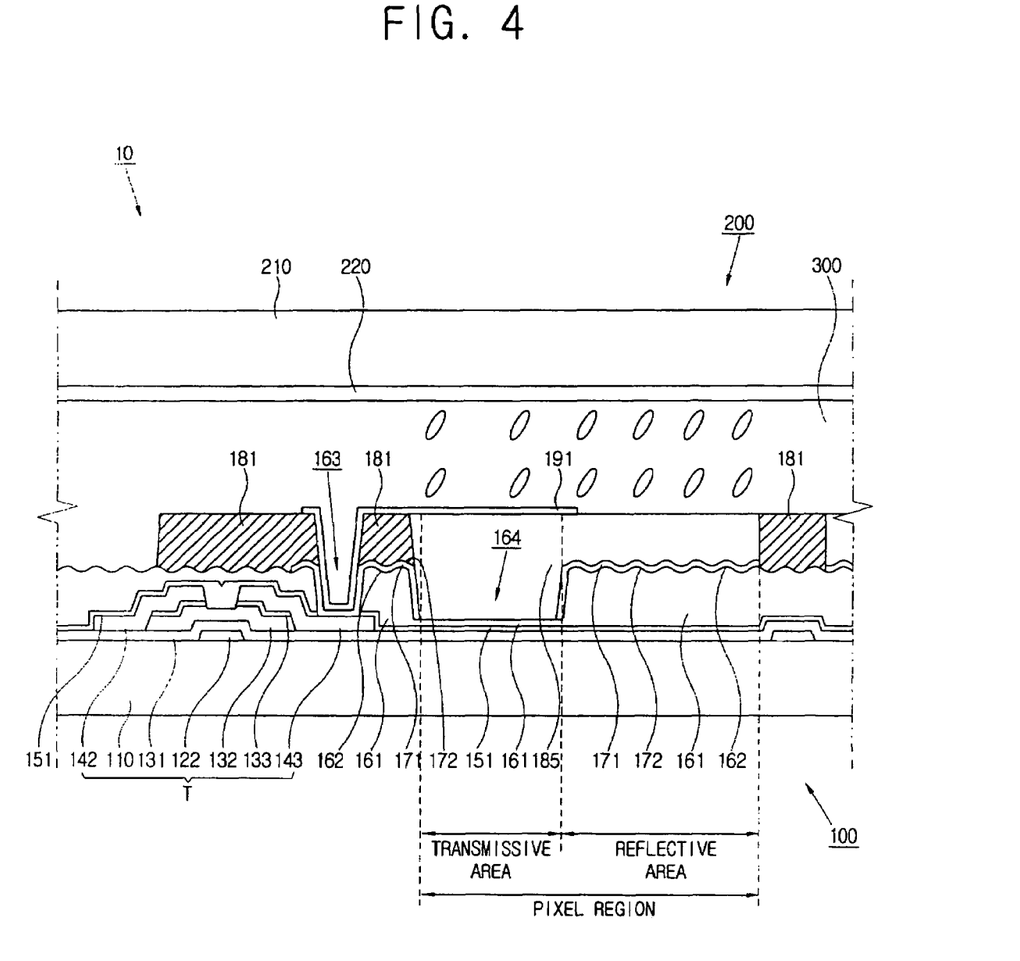
FIG. 4 is a sectional view showing a liquid crystal display device according to a second embodiment of the present invention.

Hereafter, a liquid crystal display device according to a second embodiment of the present invention will be explained in reference to FIG. 4. FIG. 4 is a sectional view of the LCD device according to the second embodiment of the invention.

The LCD device of the second embodiment differs from the first embodiment in that the organic film 161 is formed in the depressed portion 164 of the first substrate 100. In patterning the organic film 161, the intensity of light is lower relative to that of the first embodiment. With the lower intensity light, part of the organic film 161 remains in the depressed portion 164. The LCD device of this embodiment may be fabricated in substantially the same manner as in the first embodiment, and thus the details of fabrication will not be repeated for the second embodiment.

As described above, the present invention provides a liquid crystal display device and a method of fabricating the same, with which the chances of defective alignment and erroneous driving can be reduced while having an improved color reproductivity.

Although a few embodiments of the present invention have been shown and described, it will be appreciated by those skilled in the art that changes may be made in these embodiments without departing from the principles and spirit of the invention, the scope of which is defined in the appended claims and their equivalents. Moreover, the use of the terms first, second, etc. do not denote any order or importance, but rather the terms first, second, etc. are used to distinguish one element from another. Furthermore, the use of the terms an, an, etc. do not denote a limitation of quantity, but rather denote the presence of at least one of the referenced item.

What is claimed is:

1. A liquid crystal display device comprising:
   a first substrate, the first substrate including:
      a first insulating substrate, a gate line and a data line extending in substantially perpendicular directions on the first insulating substrate to define a pixel region,
      a thin film transistor provided at an intersection area of the gate line and the data line and having a drain electrode,
      an organic film formed on the thin film transistor and having a depressed portion,
      a reflective film formed on the organic film,
      a color filter layer formed in the pixel region and having a different thickness in the depressed portion than in the rest of the pixel region, and
      a pixel electrode formed on the color filter layer;
   a second substrate substantially parallel to the first substrate, the second substrate including a second insulating substrate and a common electrode formed on the second insulating substrate; and
   a liquid crystal layer placed between the first substrate and the second substrate;
   wherein the pixel electrode and the reflective film are electrically interconnected, and the pixel electrode is formed in part of the pixel region and does not fully cover the reflective film in the pixel region.

2. The liquid crystal display device as set forth in claim 1, wherein a drain contact hole is formed through the organic film to expose the drain electrode, and the reflective film and the pixel electrode are electrically connected to the drain electrode.

3. The liquid crystal display device as set forth in claim 2, wherein the reflective film directly contacts the drain electrode through the drain contact hole.

4. The liquid crystal display device as set forth in claim 3, wherein the pixel electrode is formed on the reflective film M and electrically connected with the drain electrode through the reflective film.

5. The liquid crystal display device as set forth in claim 1, wherein the pixel electrode is formed over the depressed portion.

6. The liquid crystal display device as set forth in claim 1, wherein wherein at least part of the pixel electrode is closer to the common electrode than the reflective film, for forming a different electric field between the pixel electrode and the common electrode than an electric field between the reflective film and the common electrode.

7. The liquid crystal display device as set forth in claim 1, wherein the pixel region comprises:
   a reflective area having the reflective film to reflect ambient light that enters the liquid crystal layer through the second insulating substrate; and
   a transmissive area for transmitting light that enters the liquid crystal layer through the first insulating substrate.

8. The liquid crystal display device as set forth in claim 7, wherein the color filter layer is placed between the reflective film and the liquid crystal layer.

9. The liquid crystal display device as set forth in claim 7, wherein the depressed portion is formed in the transmissive area.

10. The liquid crystal display device as set forth in claim 9, wherein the thickness of the color filter layer in the depressed portion is about 1.5 to about 2.5 times the thickness of the color filter layer in the reflective area.

11. The liquid crystal display device as set forth in claim 7, wherein the reflective area summands the transmissive area.

12. The liquid crystal display device as set forth in claim 1, wherein a surface of the color filter layer that is farthest away from the first insulating substrate is substantially flat.

13. The liquid crystal display device as set forth in claim 1, wherein the color filter layer is formed of a photosensitive colored organic composition.

14. The liquid crystal display device as set forth in claim 1, wherein there is no organic film in the depressed portion.

15. The liquid crystal display device as set forth in claim 1, further comprising an inorganic film formed between the thin film transistor and the organic film.

16. The liquid crystal display device as set forth in claim 1, wherein a lens is formed on the organic film.

17. The liquid crystal display device as set forth in claim 1, wherein the liquid crystal layer is in vertically aligned mode.

18. The liquid crystal display device as set forth in claim 1, wherein the second insulating substrate and the common electrode contact each other.

19. The liquid crystal display device as set forth in claim 1, wherein at least part of the color filter layer is present between the reflective film and the pixel electrode.

* * * * *